(12) United States Patent
Gattu et al.

(10) Patent No.: US 12,353,200 B2
(45) Date of Patent: Jul. 8, 2025

(54) SYSTEM AND METHOD FOR MONITORING COMPLEX STRUCTURES

(71) Applicant: UPTIMEAI TECH PRIVATE LIMITED, Bengaluru (IN)

(72) Inventors: Jagadish Gattu, Bengaluru (IN); Vamsi Yalamanchili, Bengaluru (IN)

(73) Assignee: UPTIMEAI TECH PRIVATE LIMITED (IN)

( * ) Notice: Subject to any disclaimer, the term of this patent is extended or adjusted under 35 U.S.C. 154(b) by 0 days.

(21) Appl. No.: 17/811,610

(22) Filed: Jul. 11, 2022

(65) Prior Publication Data
US 2023/0084950 A1 Mar. 16, 2023

(30) Foreign Application Priority Data
Jul. 14, 2021 (IN) .............................. 202141031591

(51) Int. Cl.
*G05B 23/02* (2006.01)
(52) U.S. Cl.
CPC ....... *G05B 23/024* (2013.01); *G05B 23/0235* (2013.01)
(58) Field of Classification Search
CPC .......................... G05B 23/024; G05B 23/0235
See application file for complete search history.

(56) References Cited

U.S. PATENT DOCUMENTS 9,323,247 B2 4/2016 Dillon et al.
9,842,302 B2 * 12/2017 Bates .................. G05B 23/024
10,192,170 B2 1/2019 Bates et al.
(Continued)

FOREIGN PATENT DOCUMENTS

EP 3705966 A1 9/2020

OTHER PUBLICATIONS

Maldonado et al., Optimized Neuro Genetic Fast Estimator (ONGFE) for Efficient Distributed Intelligence Instantiation within Embedded Systems, Aug. 2013, IEEE Xplore, The 2013 International Joint Conference on Neural Networks (IJCNN), pp. 1-8 (Year: 2013).*
(Continued)

*Primary Examiner* — Mi'Schita' Henson
(74) *Attorney, Agent, or Firm* — Jason C. Cameron (57) ABSTRACT

A system (10) for monitoring complex structures (15) is disclosed. The system includes a boundary creation module (50) to create a group of elements corresponding to the complex structures to define a structure boundary. The boundary creation module collects sensor data from sensors (55) coupled to the corresponding complex structures within the structure boundary. The system includes a relation identification module (60) to determine correlation across the sensor data corresponding to the sensors within the structure boundary using a deep learning model. The relation identification module identifies interrelations between the group of elements by tracking the correlation across the sensor data using the deep learning model. The system includes an anomaly detection module (70) to identify a set of characteristics of the sensor data based on the interrelations the group of elements. The anomaly detection module detects an anomaly in the group of elements by analyzing the set of characteristics.

8 Claims, 9 Drawing Sheets

(56) References Cited

U.S. PATENT DOCUMENTS

| | | | | |
|---|---|---|---|---|
| 2009/0100293 | A1* | 4/2009 | LaComb | G05B 23/0229 |
| | | | | 714/26 |
| 2019/0188584 | A1* | 6/2019 | Rao | G06Q 10/00 |
| 2020/0125470 | A1* | 4/2020 | Cui | G05B 23/0283 |
| 2021/0273958 | A1* | 9/2021 | McLean | H04L 63/1433 |
| 2023/0067434 | A1* | 3/2023 | Mehta | G06N 5/046 |
| 2023/0075005 | A1* | 3/2023 | Wu | G05B 23/024 |

OTHER PUBLICATIONS

Iqbal et al., Fault Detection and Isolation in Industrial Processes Using Deep Learning Approaches, May 2019, IEEE Transactions on Industrial Informatics, vol. 15, No. 5, pp. 3077-3084 (Year: 2019).*
Ding et al., Distributed Sensing for Quality and Productivity Improvements, Oct. 2006, IEEE Transactions on Automation Science and Engineering, vol. 2 No 4, pp. 344-358 (Year: 2006).*
Jianwu Wang, et al., Sensor Data Based System-Level Anomaly Prediction for Smart Manufacturing, 2018.

* cited by examiner

SYSTEM AND METHOD FOR MONITORING COMPLEX STRUCTURES

EARLIEST PRIORITY DATE

This International Application claims priority from a complete patent application filed in India having Patent Application No. 202141031591, filed on Jul. 14, 2021 and titled "SYSTEM AND METHOD FOR MONITORING COMPLEX STRUCTURES".

FIELD OF INVENTION

Embodiments of the present disclosure relate to monitoring system and more specifically to, a system and method for monitoring complex structures.

BACKGROUND

Unplanned outages of complex structures due to problem in structure elements may be disruptive and costly. Many times, when there is a problem in the complex structure, often it manifests as a symptom in one element, however the source of the problem is somewhere else in the structure. Despite the availability of equipment performance data and rules implemented by existing monitoring and diagnostic services, several outages are not detected before they occur. Manufacturing plants that have many equipment which are interconnected and work in unison. Material goes from one machine to the next, hundreds and thousands of times, as it gets transformed to the final product. A primary reason for the failure to detect the outages is inefficient data analysis techniques which only catch issues when obvious symptoms show up leaving insufficient time to act. Such techniques or rules, thereby reducing the reliability and usability of existing prediction methods.

Existing solutions monitor individual or small group of elements as monolithic units that may not encapsulate the causing element and the impacted element. This is due to complexity in processing large amounts of data especially when trying to capture large number of elements to contain both causing element and the impacted element. Analyzing complex structures may be overwhelming with large set of elements as humans need to limit the combinations to understand the correlations. Most of the existing solutions take small monolithic units for monitoring which do not encapsulate the causing element. Such monolithic units cannot be broken into further sub-units and hence users cannot validate the cause and impact. As a result, majority of the time causing element is left out of the monolithic unit that is being monitored. Hence existing solutions have a large number of monolithic units that cover few elements of the complex structure. This results in inability to identify the cause.

Furthermore, in some cases many such monolithic units are monitored separately to obtain disjointed alarms across several such units. However, in such cases also several of the alarms corresponding to separate monolithic units can be caused by the same source or cause. However, user still does not know the source of the problem. As a result, there is significant loss of productivity, inability to respond to issues in time, understand the root cause of the problem resulting in repeated problems, before the damage is done, and symptoms reappearing again in the future.

Hence, there is a need for an improved system and method for monitoring complex structures to address the aforementioned issues.

BRIEF DESCRIPTION

In accordance with an embodiment of the present disclosure, a system for monitoring complex structures with dynamic cause and impact is provided. The system includes a processing subsystem hosted on a server and configured to execute on a network to control bidirectional communications among a plurality of modules. The processing subsystem includes a boundary creation module configured to create a group of elements corresponding to the one or more complex structures to define a structure boundary. The boundary creation module is also configured to collect sensor data from one or more sensors coupled to the corresponding one or more complex structures within the structure boundary. The processing subsystem also includes a relation identification module configured to determine correlation across the sensor data corresponding to the one or more sensors within the structure boundary of the one or more complex structures using a deep learning model. The relation identification module is also configured to identify one or more interrelations between the group of elements by tracking the correlation across the sensor data using the deep learning model. The processing subsystem further includes an anomaly detection module configured to identify a set of characteristics of the sensor data based on the one or more interrelations the group of elements identified by the relation identification module, where the set of characteristics represents one or more patterns in the sensor data. The anomaly detection module is also configured to detect an anomaly in the group of elements by analyzing the set of characteristics, where analyzing the set of characteristics comprises deviation of the set of characteristics from an automatically determined statistically significant threshold level.

In accordance with another embodiment of the present disclosure, a method for monitoring complex structures is provided. The method includes creating, by a boundary creation module, a group of elements corresponding to the one or more complex structures to define a structure boundary. The method also includes collecting, by the boundary creation module, sensor data from one or more sensors coupled to the corresponding one or more complex structures within the structure boundary. The method further includes determining, a relation identification module, correlation across the sensor data corresponding to the one or more sensors within the structure boundary of the one or more complex structures using a deep learning model. The method further includes identifying, by the relation identification module, one or more interrelations between the group of elements by tracking the correlation across the sensor data using the deep learning model. The method further includes identifying, by an anomaly detection module, a set of characteristics of the sensor data based on the one or more interrelations the group of elements identified by the relation identification module, wherein the set of characteristics represents one or more patterns in the sensor data. The method further includes detecting, by the anomaly detection module, an anomaly in the group of elements by analyzing the set of characteristics, wherein analyzing the set of characteristics comprises deviation of the set of characteristics from an automatically determined statistically significant threshold level To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to system and method for monitoring complex structures. As used herein, complex structures are the structures where there is a plurality of elements which influence each other to achieve a function. In one embodiment, the complex structure may include at least one of a manufacturing plant or a human body, a car, space craft and the like. In manufacturing, the elements are machines; in a car/space craft, they are parts, and in a human body they are organs. Similarly, as used herein, the element is an individual item that is self-sufficient in performing a function for example: for a machine the element is defined as flange to flange or a single enclosure. The objective of the system is to monitor groups of elements so that inter relations between element and thereby the impact of one element on the health and performance of the other element may be identified and presented to the user. In order to achieve the objective, the system provides the ability to model complex structures which may have hundreds of sensors corresponding to a plurality of elements. The system is being able to give the user the ability to understand where the problem is originating within the complex structure. This is important because without the ability to understand and pinpoint the source of the problem the user is unable to fix the issue or prevent a repeat of the same issue. This requires not only isolating the problem within the complex structure but also workflows that enable the user to dissect and analyze both groups of elements as well as the individual element.

Figure 1:
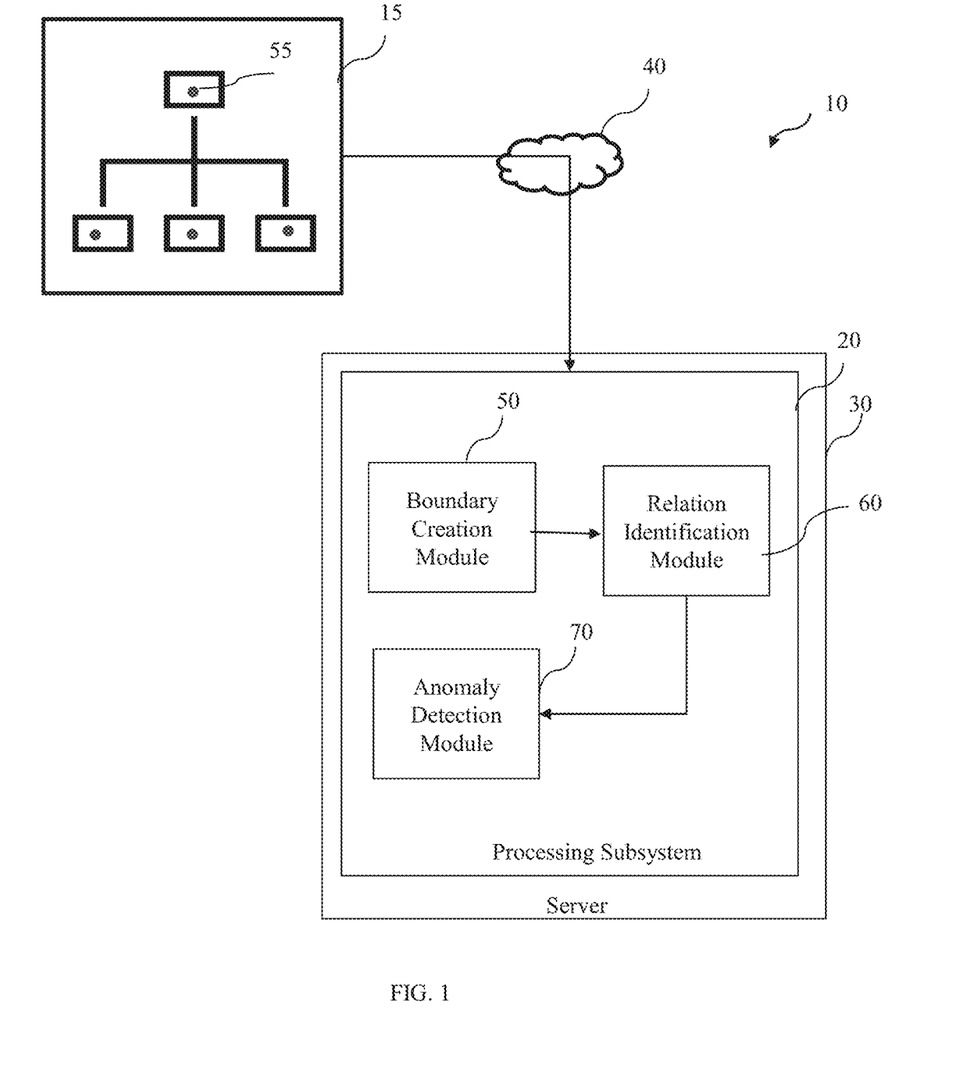
FIG. 1 is a block diagram representation of system for monitoring complex structures in accordance with an embodiment of the present disclosure.

FIG. 1 is a block diagram representation of a system 10 for monitoring complex structures 15 in accordance with an embodiment of the present disclosure. The system 10 includes a processing subsystem 20 hosted on a server 30. In one embodiment, the server 30 may be a cloud-based server. In another embodiment, parts of the server 30 may be a local server coupled to a user interface. In such an embodiment, the user interface may include different portable electronic mobile devices, including but not limited to, cellular phones, personal digital assistants PDA's, laptop computers, portable gaming devices, portable media players, tablets, e-book readers, watches, as well as non-portable devices such as desktop computers. The user may include one or more input/output devices configured to allow user interaction with one or more programs configured to communicate with the server.

The processing subsystem 20 is configured to execute on a network 40 to control bidirectional communications among a plurality of modules. In one embodiment, the network 40 may include one or more terrestrial and/or satellite networks interconnected to communicatively connect the user device to web server engine and data collection module. In one example, the network 40 may be a private or public local area network LAN or Wide Area Network WAN, such as the Internet. In another embodiment, the network 40 may include both wired and wireless communications according to one or more standards and/or via one or more transport mediums. In one example, the network 40 may include wireless communications according to one of the 802.11 or Bluetooth specification sets, or another standard or proprietary wireless communication protocol. In yet another embodiment, the network 40 may also include communications over a terrestrial cellular network, including, a GSM global system for mobile communications, CDMA code division multiple access, and/or EDGE enhanced data for global evolution network.

The processing subsystem 20 includes a boundary creation module 50 configured to create a group of elements corresponding to the one or more complex structures 15 to define a structure boundary. In one embodiment, the boundary creation module 50 is configured to create the group of elements into a hierarchy including units, sub-elements, the one or more sensors corresponding to the elements. More specifically, the boundary creation module 50 represents the complex structures as a non-monolithic unit using a combination of a logical model and a deep learning model. Furthermore, the boundary creation module 50 is configured to collect sensor data from one or more sensors 55 coupled to the corresponding one or more complex structures within the structure boundary. The logical model groups the sensor data into a hierarchy that represent individual elements, and elements that are then grouped into a hierarchy of elements to represent the complex structure. The deep learning model that learns the correlations across the sensors 55 across the complex structure. In some embodiments, the user may set up hierarchy within the system starting from enterprise to plant to a unit and within a unit the different sub-systems and within the sub-system the different equipment, and the different sensors corresponding to an equipment. The system includes a user interface to create this hierarchy in a quick and easy way. Once the structure boundary is defined and the equipment inside the structure boundary, the user may add the one or more sensors 55 within an equipment or a sub-system. Hence, the system may take any number of sensors available at the manufacturing plant.

Furthermore, the processing subsystem 20 includes a relation identification module 60 which is configured to determine correlation across the sensor data corresponding to the one or more sensors within the structure boundary of the one or more complex structures using the deep learning model. The relation identification module 50 is also configured to identify one or more interrelations between the group of elements by tracking the correlation across the sensor data using the deep learning model. More specifically, to enable a hybrid model, the relation identification module 50 is configured to use a combination of deep learning and an inferencing engine. The deep learning neural network-based models allow the system to scale to large number of sensors per system using a data centric approach. By taking a single system level model that combines multiple sensors belonging to multiple upstream/downstream equipment, the relation identification module captures the correlations across the sensors across the complex structure and learns the interrelations between elements in the complex structure. In one embodiment, the relation identification module 50 is configured to map the one or more sensor to one or more predefined failure modes at an element level and a unit level.

Subsequently, the processing subsystem 20 includes an anomaly detection module 70 which is configured to identify a set of characteristics of the sensor data based on the one or more interrelations the group of elements identified by the relation identification module 60. The set of characteristics represents one or more patterns in the sensor data. The anomaly detection module 70 is also configured to detect an anomaly in the group of elements by analyzing the set of characteristics, where analyzing the set of characteristics includes deviation of the set of characteristics from statistically significant threshold levels. In one embodiment, the anomaly detection module 70 is configured to rank the group of elements corresponding to detected anomaly within the complex structure. In such an embodiment, the anomaly detection module 70 is configured to detect at least one of sensor data corresponding to the anomaly, element corresponding to the anomaly and health of each element. In a specific embodiment, the anomaly detection module 70 is configured to create a heatmap of at least one of the one or more sensors and the group of elements when a plurality of elements from the group of elements are detected with the anomaly. In such an embodiment, the anomaly detection module 70 is also configured to identify cause, impact and progress of the anomaly over a period of time across the plurality of elements and the corresponding one or more sensors via individual tag deviation in the heatmap.

More Specifically, the anomaly detection module 70 provides an ability to visualize the beginning of the problem via individual tag deviations in a heatmap to identify which element has is the cause and which element is the impacted. The anomaly detection module 70 also provides an ability to generate failure modes across each element to infer the issues being identified. The anomaly detection module 70 offers flexibility to the user to dynamically resize the monolithic unit into any combination of underlying elements with the ability of visualize and validate the causing and impacted element and an ability to understand the percent contribution of each element in the complex structure corresponding to a specific issue/anomaly. In one embodiment, the anomaly detection module 70 is configured to select/deselect elements and adjust the context of the complex structure to turn on/off any element in the complex structure without impacting the interrelations between the elements and enable/disable specific set of tags without impacting the interrelations between elements. In such an embodiment, the anomaly detection module 70 is configured to visualize the failure modes only for specifically the elements or tags that are in the context. In some embodiments, the anomaly detection module 70 is configured to detect any unknown issues and provide value to the user even if they do not have the standard sensors.

In addition, the anomaly detection module 70 enables extracting the insights and pointing the failure modes to specific equipment. However, the other main challenge with system models is providing user interface that enables users to understand which signals are contributing to the problem, which equipment is contributing to the problem, identifying the source of problem if multiple equipment are showing symptoms, identifying the failure modes of the problems and ability to analyze the health of individual equipment.

Figure 2:
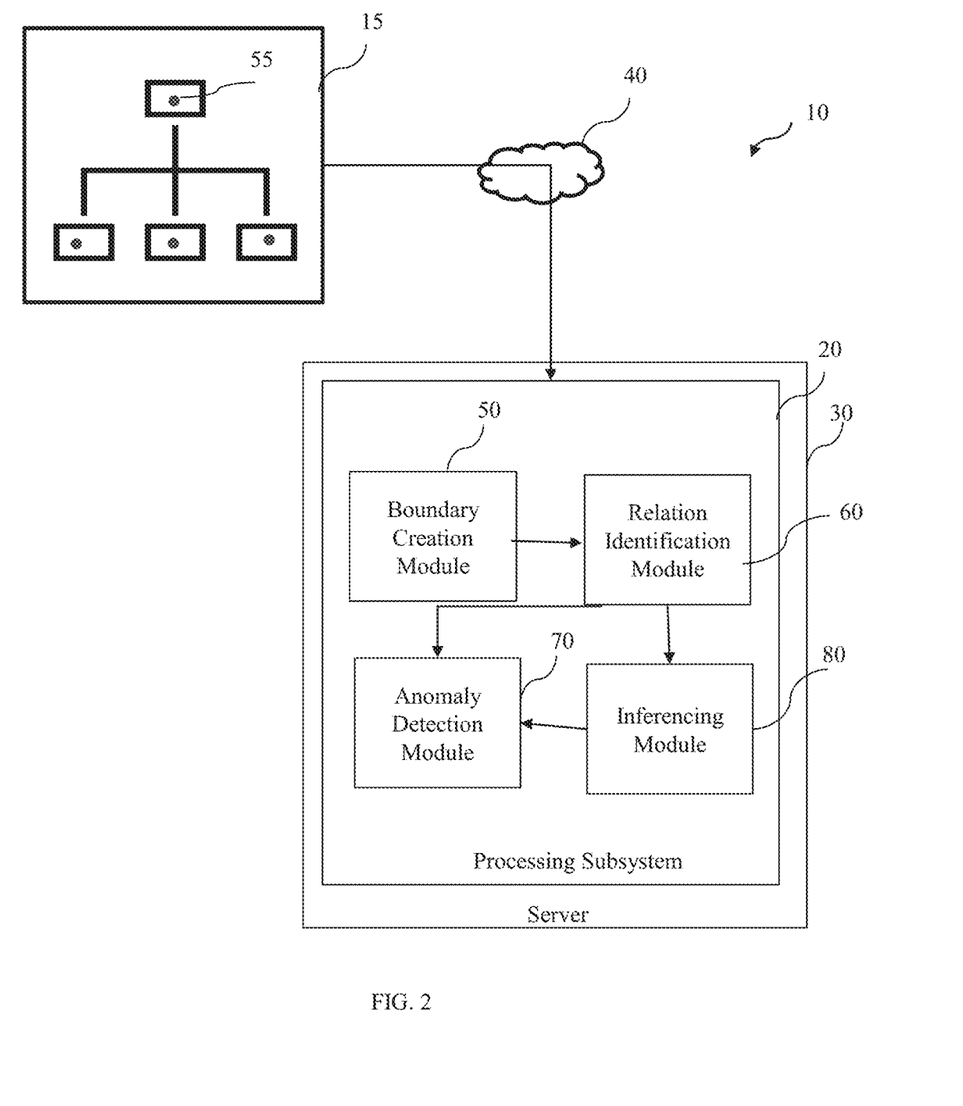
FIG. 2 is a block diagram representation of one embodiment of the system of FIG. 1 in accordance with an embodiment of the present disclosure.

FIG. 2 is a schematic representation of one embodiment of the system 10 of FIG. 1 in accordance with an embodiment of the present disclosure. The system 10 of FIG. 1 includes the processing subsystem 20 including the boundary creation module 50, the relation identification module 60 and the anomaly detection module 70. In one embodiment, the processing subsystem 20 also includes an inferencing module 80 which is coupled to the relation identification module 60. The inferencing module 80 is configured to obtain insights from the deep learning model and interpret the insights using a plurality of fingerprints of the one or more predefined failure modes. The inferencing module 80 is also configured to inference contribution of each element of the group of elements in the complex structure corresponding to the anomaly. In detail, the inferencing module 80 takes the insights from the deep learning models and interprets them using fingerprints/characteristics of the known failure modes. The deep learning models have been trained to provide explanation using a combination of residuals, shapely, sensitivity analysis, and other approaches. The inferencing module 80 is configured to provide explanation of failure modes corresponding to individual elements. The inferencing module 80 has a large database that captures the leading indicators of different types of failures. The deep learning models are trained to identify and provide a specific set of characteristics of the signals that represent the patterns in the signals. For example, characteristics may include a rapid rise, stable but noisy, increasing and noisy associated with an equipment.

Figure 3:
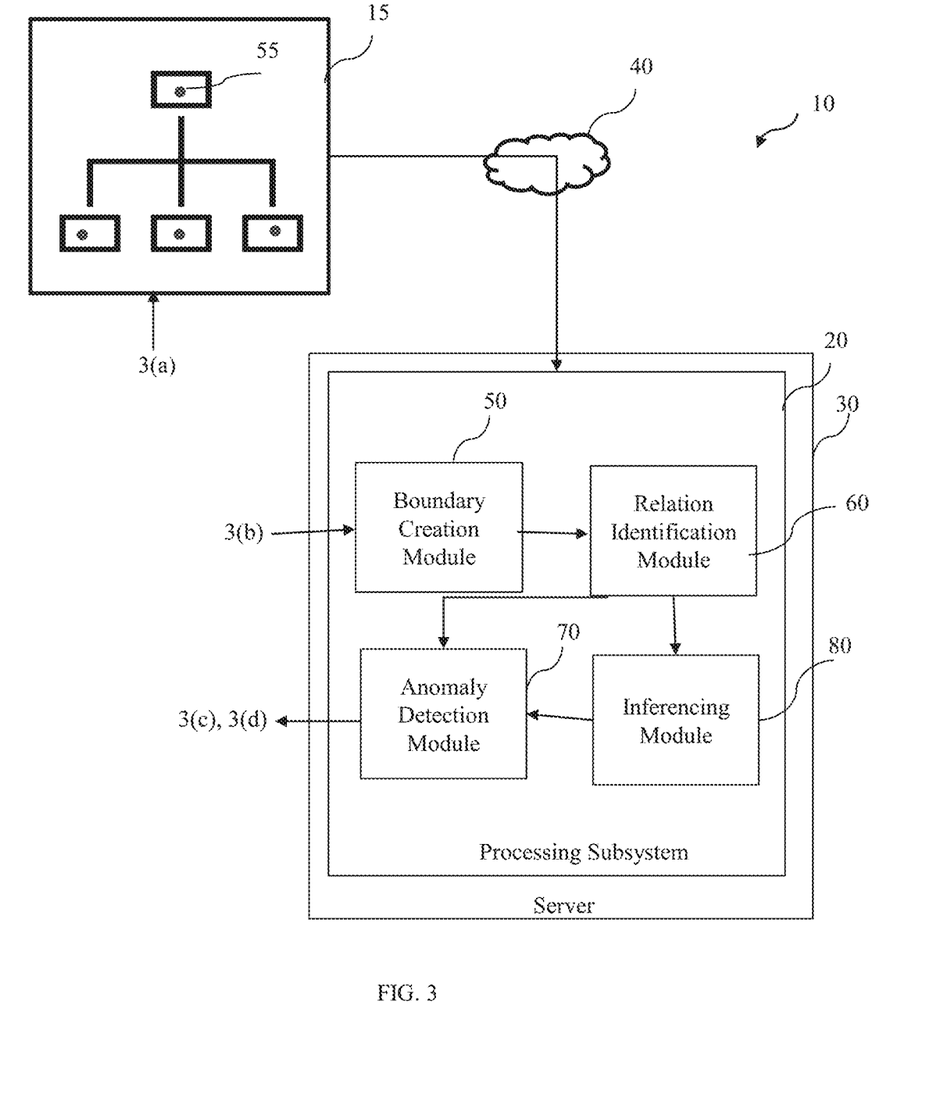
FIG. 3 is a schematic representation of an exemplary system of FIG. 1 in accordance with an embodiment of the present disclosure.
Figure 3A:
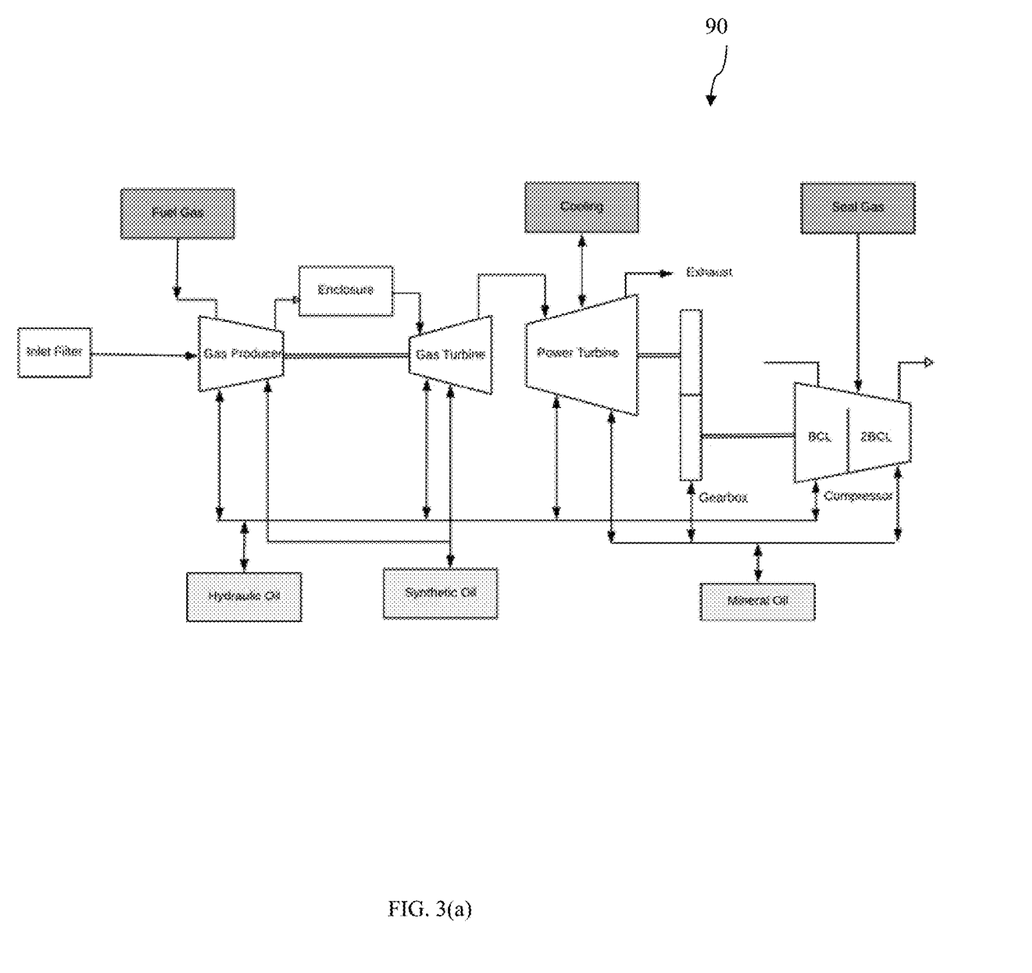
FIG. 3a is a schematic representation of an exemplary plant for system of FIG. 3 in accordance with an embodiment of the present disclosure.
Figure 3B:
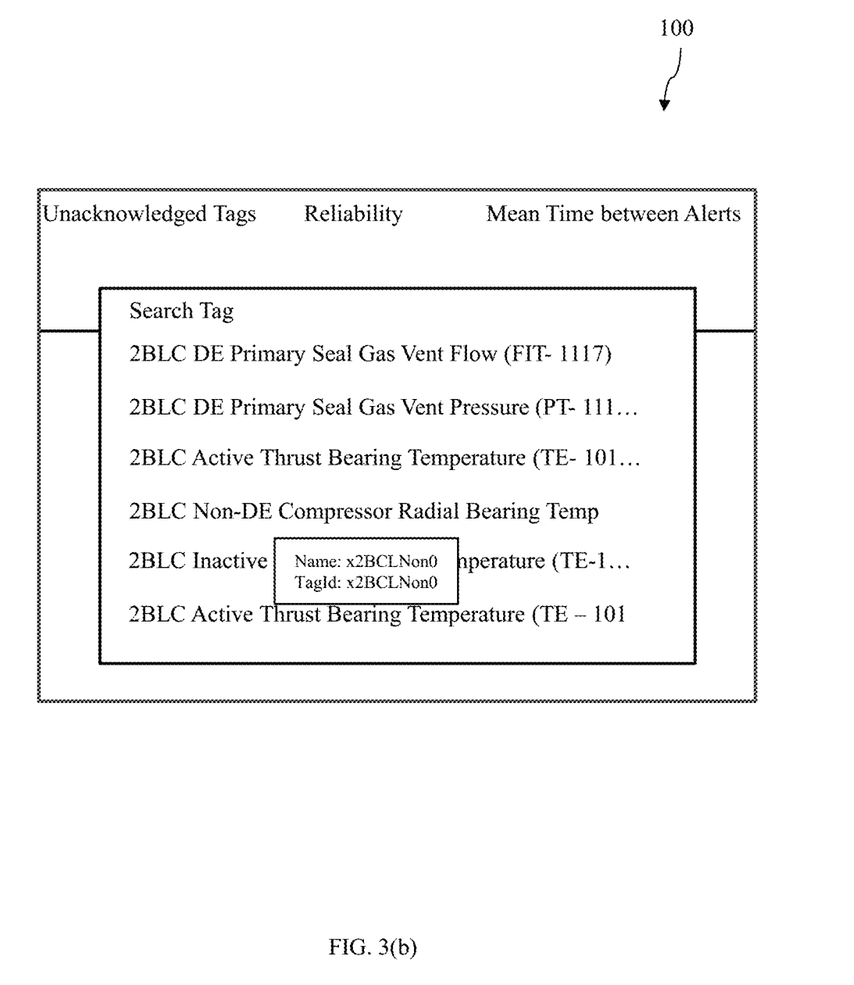
FIG. 3b is a schematic representation of one embodiment of system of FIG. 3 in accordance with an embodiment of the present disclosure.

FIG. 3 is a schematic representation of an exemplary embodiment of the system (10) of FIG. 1 in accordance with an embodiment of the present disclosure. Consider a non-limiting example of an oil and gas plant 90 having a plurality of equipment as shown in FIG. 3a. Modeling individual equipment with limited set of signals makes it easy for users to analyze and understand the problem. There are times when the issues are not obvious/known or the user wants to evaluate the diagnosis from the inferencing engine. In such scenarios, a human engineer needs to analyze the issue manually. However, with 300-1000 signals coming from 15 to 20 equipment in one single system model, analyzing a problem may be extremely complex if the right analysis interface is not available. The system 10 includes a processing subsystem 20 including a boundary creation module 50 which provides filtering of specific equipment or group of equipment depending upon the need to define the structure boundary. Once the structure boundary is defined and the equipment inside it, the boundary creation module 50 further includes one or more sensors available at the manufacturing plant. The user may set up hierarchy within the system starting from enterprise to plant to a unit and within a unit the different systems and within the system the different equipment, and the different sensors corresponding to an equipment using a user interface 100 as shown in FIG. 3b.

Figure 3C:
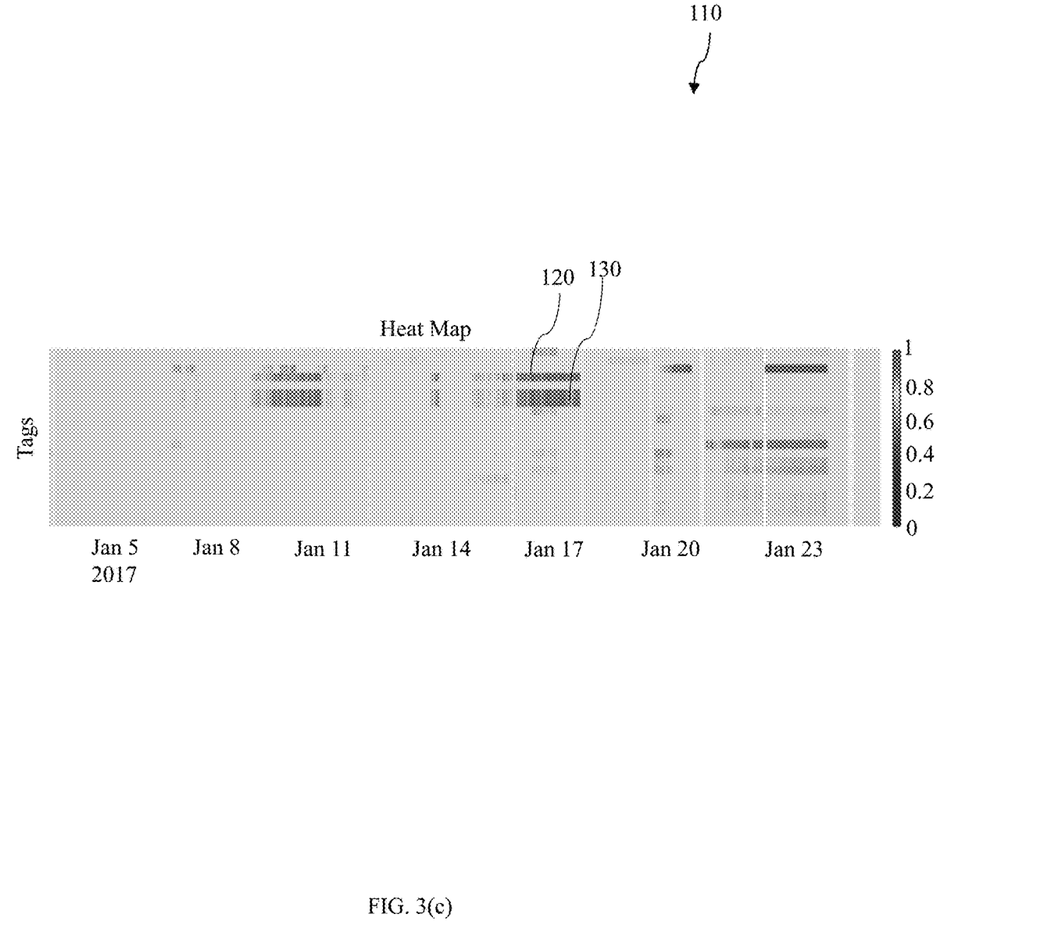
FIG. 3c is a schematic representation of another embodiment of system of FIG. 3 in accordance with an embodiment of the present disclosure.

Moreover, the relation identification module 60 of the processing subsystem 20 identifies the correlations across the sensors across the complex structure and the interrelations between the elements by tracking the correlations between elements in the complex structure. Consequently, the anomaly detection module 70 of the processing subsystem 20 is configured to provide the ability to identify which equipment within the oil and gas plant are misbehaving in a ranked order. The user may select/unselect specific equipment within the plant to remove unnecessary equipment from the scope of analysis. This gives the flexibility to the user to reduce the scope of the analysis to what is needed. When there are multiple equipment that are in the scope of analysis or showing symptoms, the anomaly detection module understand what is the source/cause and what is the impact. To provide this understanding, the anomaly detection module 70 provides an heatmap for the individual sensors and/or individual equipment. The heatmap demonstrates the progress of the issue over a period of time across different signals and different equipment. Hence, the user may see which signal or which equipment the issue first originated in, and how the issue is progressed from one equipment to another. As shown in FIG. 3c, the heatmap 110 of the oil and gas plant showing the initial whitish regions 120 of signals which are the sources and then other red regions 130 that are from the impact of this initial signal.

Figure 3D:
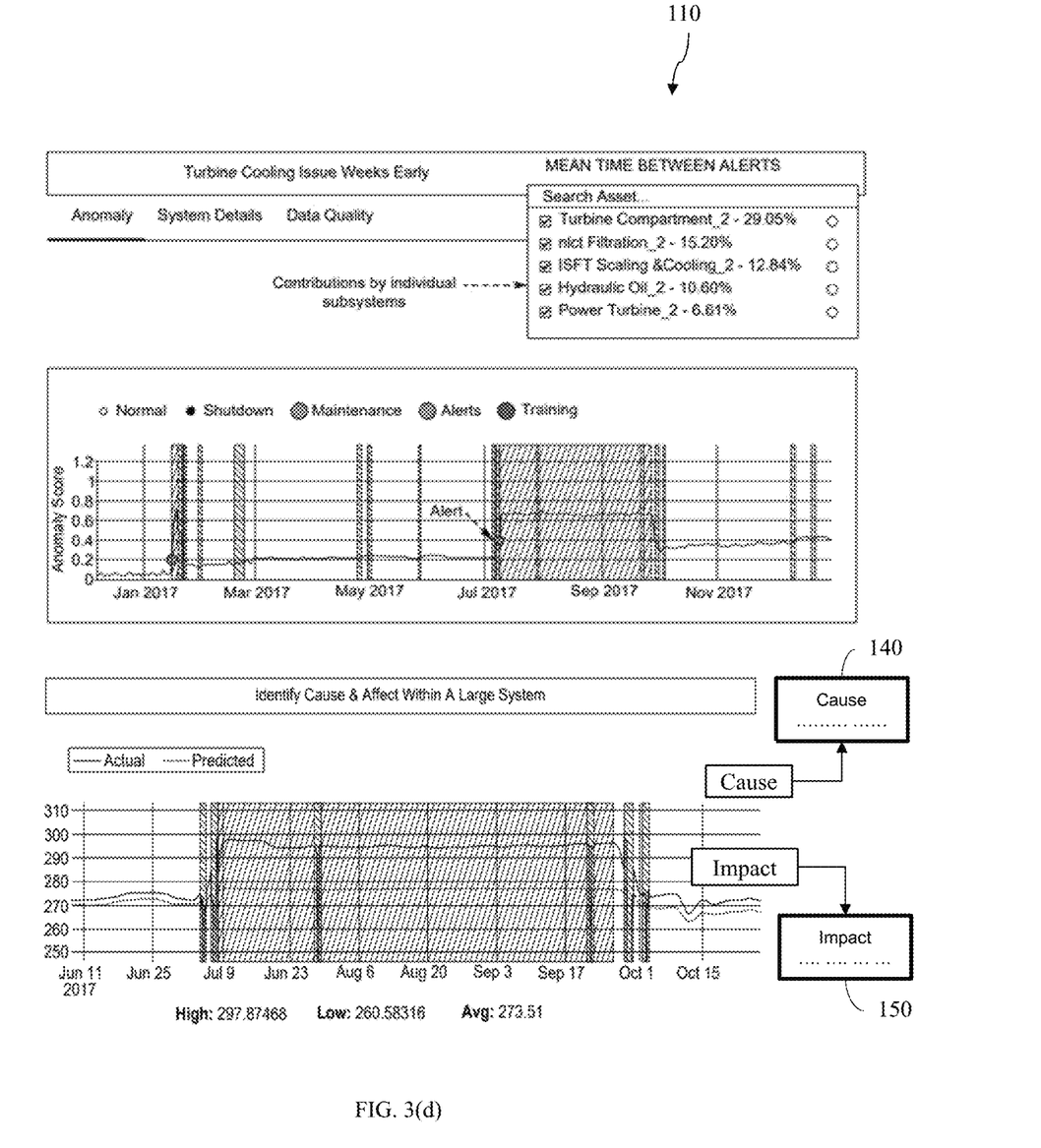
FIG. 3d is a schematic representation of yet another embodiment of system of FIG. 3 in accordance with an embodiment of the present disclosure.

When analyzing a plant level issue that manifests in multiple equipment, the anomaly detection module 70 identifies the specific failure modes. When the user is analyzing the issue, the system automatically uses the inferencing module 80 to demonstrate the specific failure modes within each equipment that is showing symptoms. Further, each of the above mentioned capabilities may be filtered by selection/deselection of a single or group of equipment or signals, thereby allowing the user to dive into specific equipment or a custom group of equipment. The equipment failure mode diagnosis within the system showing the diagnosis of individual equipment. By combining the failure modes and the heatmaps, the user may understand which failure mode is happening first such as root cause 140 and what is the impact 150 as shown in FIG. 3d.

Figure 4:
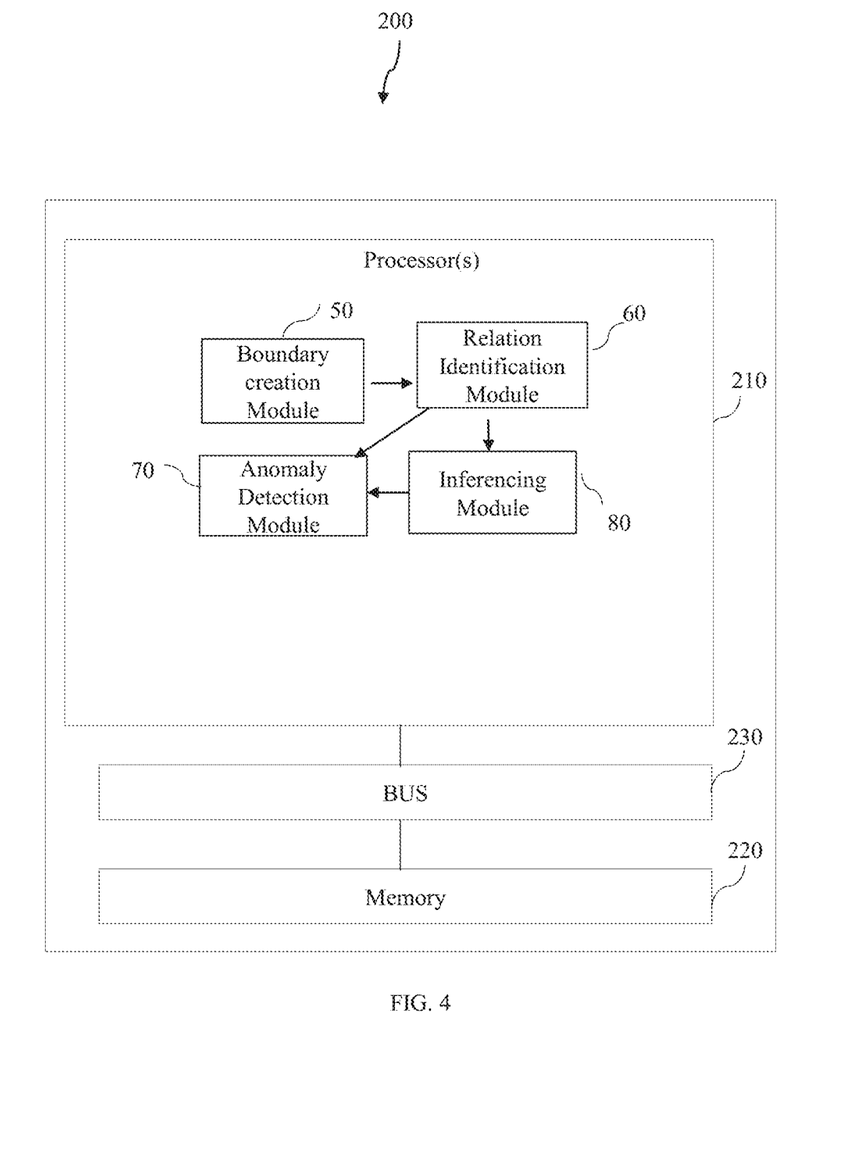
FIG. 4 is a block diagram of a computer or a server for system in accordance with an embodiment of the present disclosure.

FIG. 4 is a block diagram of a computer or a server 200 for system 10 in accordance with an embodiment of the present disclosure. The server includes processors (210), and memory 220 operatively coupled to the bus 230.

The processors 210, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The processor 210 includes a plurality of subsystems and a plurality of modules stored in the form of executable program to perform the method steps illustrated in FIG. 1. The processor 210 is substantially similar to the processing subsystem 20 of FIG. 1. The processor 210 has following subsystems: the boundary creation module 50, the relation identification module 60, the anomaly detection module 70 and the inferencing module 80.

The processing subsystem 20 includes a boundary creation module 50) configured to create a group of elements corresponding to the one or more complex structures to define a structure boundary. The boundary creation module is also configured to collect sensor data from one or more sensors coupled to the corresponding one or more complex structures within the structure boundary. The processing subsystem 20 also includes a relation identification module 60 configured to determine correlation across the sensor data corresponding to the one or more sensors within the structure boundary of the one or more complex structures using a deep learning model. The relation identification module is also configured to identify one or more interrelations between the group of elements by tracking the correlation across the sensor data using the deep learning model.

The processing subsystem 20 further includes an anomaly detection module 70 configured to identify a set of characteristics of the sensor data based on the one or more interrelations the group of elements identified by the relation identification module, where the set of characteristics represents one or more patterns in the sensor data. The anomaly detection module is also configured to detect an anomaly in the group of elements by analyzing the set of characteristics, where analyzing the set of characteristics comprises deviation of the set of characteristics from a from an automatically determined statistically significant threshold level. The processing subsystem 20 includes the inferencing module 80 which is configured to obtain insights from the deep learning model and interpret the insights using a plurality of fingerprints of the one or more predefined failure modes. The inferencing module 80 is also configured to inference contribution of each element of the group of elements in the complex structure corresponding to the anomaly.

Computer memory elements may include any suitable memory devices for storing data and executable program, such as read only memory, random access memory, erasable programmable read only memory, electrically erasable programmable read only memory, hard drive, removable media drive for handling memory cards and the like. Embodiments of the present subject matter may be implemented in conjunction with program modules, including functions, procedures, data structures, and application programs, for performing tasks, or defining abstract data types or low-level hardware contexts. Executable program stored on any of the above-mentioned storage media may be executable by the processors 210.

Figure 5:
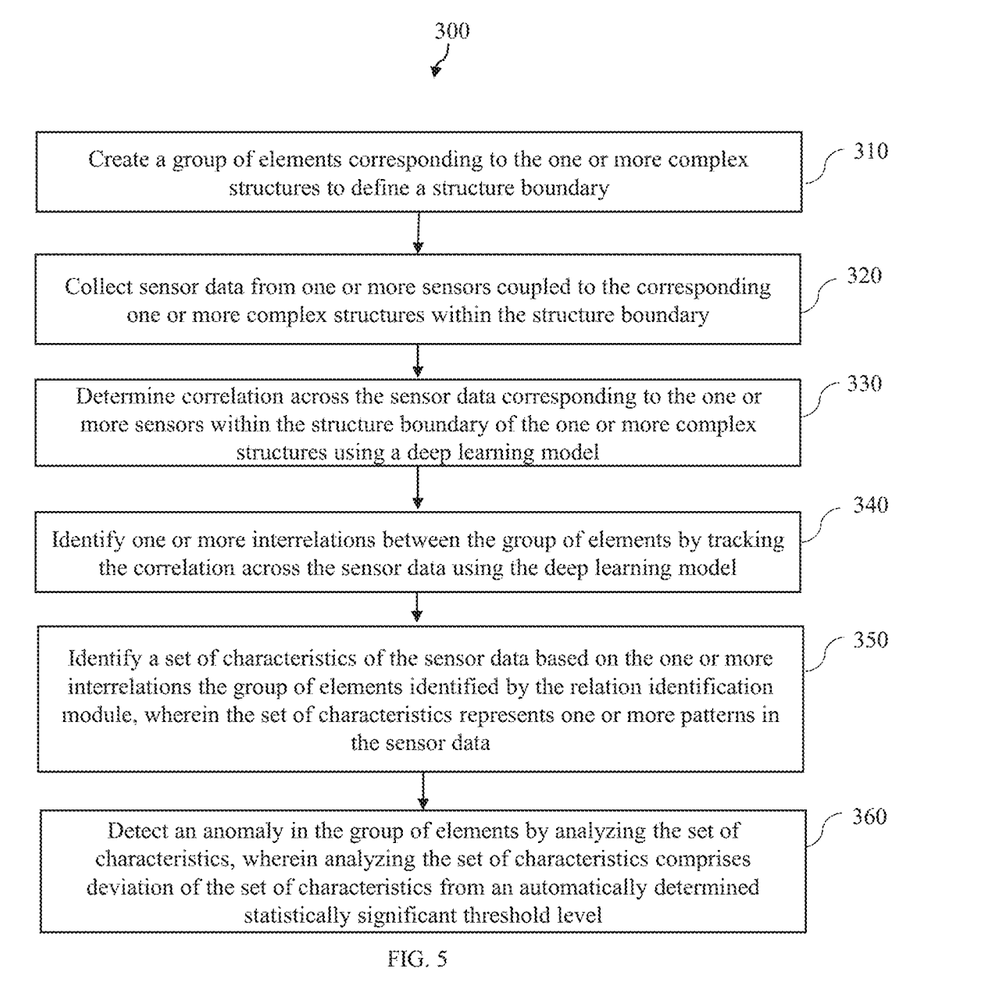
FIG. 5 illustrates a flow chart representing the steps involved in a method for populating web-based form in one click and managing e-commerce checkout process in accordance with an embodiment of the present disclosure.

FIG. 5 is a flowchart representing steps involved in a method 300 for monitoring one or more complex structures in accordance with an embodiment of the present disclosure. The method 300 includes creating a group of elements corresponding to the one or more complex structures to define a structure boundary in step 310. In one embodiment, creating a group of elements corresponding to the one or more complex structures includes creating a group of elements corresponding to the one or more complex structures by a boundary creation module. In a specific embodiment, the boundary creation module is configured to create the group of elements into a hierarchy comprising units, sub-elements, the one or more sensors corresponding to the elements.

The method 300 also includes collecting sensor data from one or more sensors coupled to the corresponding one or more complex structures within the structure boundary in step 320. In one embodiment, collecting sensor data from one or more sensors coupled to the corresponding one or more complex structures includes collecting sensor data from one or more sensors coupled to the corresponding one or more complex structures by the boundary creation module. In some embodiments, the user may set up hierarchy within the system starting from enterprise to plant to a unit and within a unit the different sub-systems and within the sub-system the different equipment, and the different sensors corresponding to an equipment. The system includes a user interface to create this hierarchy. To enable a hybrid model, the relation identification module is configured to use a combination of deep learning and an inferencing engine. The deep learning neural network-based models allows the system to scale to large number of sensors per system using a data centric approach.

The method 300 further includes determining correlation across the sensor data corresponding to the one or more sensors within the structure boundary of the one or more complex structures using a deep learning model in step 330. In one embodiment, determining correlation across the sensor data corresponding to the one or more sensors includes determining correlation across the sensor data corresponding to the one or more sensors by a relation identification module. The method 300 further includes identifying one or more interrelations between the group of elements by tracking the correlation across the sensor data using the deep learning model in step 340. In one embodiment, identifying one or more interrelations between the group of elements includes identifying one or more interrelations between the group of elements by the relation identification module. In one embodiment, the relation identification module is configured to map the one or more sensor to one or more predefined failure modes at an element level and a unit level.

The method (300) further includes identifying a set of characteristics of the sensor data based on the one or more interrelations the group of elements identified by the relation identification module, where the set of characteristics represents one or more patterns in the sensor data in step 350. In one embodiment, identifying a set of characteristics of the sensor data includes identifying a set of characteristics of the sensor data by an anomaly detection module. The method 300 further includes detecting an anomaly in the group of elements by analyzing the set of characteristics, where analyzing the set of characteristics comprises deviation of the set of characteristics from an automatically determined statistically significant threshold level in step 360. In one embodiment, detecting an anomaly in the group of elements by analyzing the set of characteristics includes detecting an anomaly in the group of elements by analyzing the set of characteristics by the anomaly detection module.

In one embodiment, the method includes ranking the group of elements corresponding to detected anomaly within the complex structure. In such an embodiment, the method includes detecting at least one of sensor data corresponding to the anomaly, element corresponding to the anomaly and health of each element. In a specific embodiment, the method includes creating a heatmap of at least one of the one or more sensors and the group of elements when a plurality of elements from the group of elements are detected with the anomaly. In such an embodiment, the method also includes detecting an anomaly in the group of elements by analyzing the set of characteristics, where analyzing the set of characteristics comprises deviation of the set of characteristics from an automatically determined statistically significant threshold level.

In one embodiment, the method includes obtaining insights from the deep learning model and interpret the insights using a plurality of fingerprints of the one or more predefined failure modes. In such an embodiment, obtaining insights from the deep learning model and interpret the insights using a plurality of fingerprints of the one or more predefined failure modes includes obtaining insights from the deep learning model and interpret the insights using a plurality of fingerprints of the one or more predefined failure modes by an inferencing module. In a specific embodiment, the method also includes inferencing contribution of each element of the group of elements in the complex structure corresponding to the anomaly. In such an embodiment, inferencing contribution of each element of the group of elements in the complex structure corresponding to the anomaly include inferencing contribution of each element of the group of elements in the complex structure corresponding to the anomaly by the inferencing module.

Various embodiments of the system and method for monitoring complex structures described above enables representing complex structures as non-monolithic units, allowing users to determine cause and the impact elements regardless of the size of the structure hours vs weeks of manual analysis to identify issues. The system encapsulates the problem as a single issue/alert 10× reduction of alarms and enables the user to analyze and validate the cause and impact elements by isolating the corresponding elements within the complex structure isolating the cause in hours. Also, the system monitors the entire complex structure in its entirety scalability of monitoring complex structures and monitoring 100% of the structure Vs 10%-20%

It will be understood by those skilled in the art that the foregoing general description and the following detailed description are exemplary and explanatory of the disclosure and are not intended to be restrictive thereof. While specific language has been used to describe the disclosure, any limitations arising on account of the same are not intended.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:

1. A system (10) for monitoring one or more complex structures (15) comprising:
   a processing subsystem (20) hosted on a server (30) and configured to execute on a network (40) to control bidirectional communications among a plurality of modules comprising:
   a boundary creation module (50) configured to:
      create a group of elements corresponding to the one or more complex structures (15) to define a structure boundary;
      collect sensor data from one or more sensors (55) coupled to the corresponding one or more complex structures (15) within the structure boundary;
      create the group of elements into a hierarchy comprising units, sub-elements, the one or more sensors corresponding to the elements;
   a relation identification module (60) configured to:
      determine correlation across the sensor data corresponding to the one or more sensors (55) within the structure boundary of the one or more complex structures (15) using a deep learning model;
      identify one or more interrelations between the group of elements by tracking the correlation across the sensor data using the deep learning model;
      map the one or more sensor to one or more predefined failure modes at an element level and a unit level;
   an anomaly detection module (70) configured to:
      identify a set of characteristics of the sensor data based on the one or more interrelations the group of elements identified by the relation identification module (60), wherein the set of characteristics represents one or more patterns in the sensor data; and
      detect an anomaly in the group of elements by analyzing the set of characteristics, wherein analyzing the set of characteristics comprises deviation of the set of characteristics from an automatically determined statistically significant threshold level.

2. The system (10) as claimed in claim 1, comprising an inferencing module (80) coupled to the relation identification module, wherein the inferencing module (80) is configured to:
   obtain insights from the deep learning model and interpret the insights using a plurality of fingerprints of the one or more predefined failure modes; and
   inference contribution of each element of the group of elements in the complex structure (15) corresponding to the anomaly.

3. The system (10) as claimed in claim 2, wherein the inferencing module (80) comprises a database configured to capture a plurality of leading indicators of the corresponding one or more predefined failure modes.

4. The system (10) as claimed in claim 1, wherein the anomaly detection module (70) is configured to rank the group of elements corresponding to detected anomaly within the complex structure.

5. The system as claimed in claim 1, wherein the anomaly detection module (70) is configured to detect at least one of sensor data corresponding to the anomaly, element corresponding to the anomaly and health of each element.

6. The system as claimed in claim 1, wherein the anomaly detection module (70) is configured to:
   create a heatmap of at least one of the one or more sensors and the group of elements when a plurality of elements from the group of elements are detected with the anomaly; and
   identify cause, impact and progress of the anomaly over a period of time across the plurality of elements and the corresponding one or more sensors via individual tag deviation in the heatmap.

7. A method (300) for monitoring one or more complex structures comprising:
   creating, by a boundary creation module, a group of elements corresponding to the one or more complex structures to define a structure boundary; (310)
   collecting, by the boundary creation module, sensor data from one or more sensors coupled to the corresponding one or more complex structures within the structure boundary; (320)
   determining, a relation identification module, correlation across the sensor data corresponding to the one or more sensors within the structure boundary of the one or more complex structures using a deep learning model; (330)
   identifying, by the relation identification module, one or more interrelations between the group of elements by tracking the correlation across the sensor data using the deep learning model; (340)
   identifying, by an anomaly detection module, a set of characteristics of the sensor data based on the one or more interrelations the group of elements identified by the relation identification module, wherein the set of characteristics represents one or more patterns in the sensor data; (350) and
   detecting, by the anomaly detection module, an anomaly in the group of elements by analyzing the set of characteristics, wherein analyzing the set of characteristics comprises deviation of the set of characteristics from an automatically determined statistically significant threshold level (360).

8. The method (300) as claimed in claim 7, comprising:
   obtaining, by an inferencing module, insights from the deep learning model and interpret the insights using a plurality of fingerprints of the one or more predefined failure modes; and
   inferencing, by the inferencing module, contribution of each element of the group of elements in the complex structure corresponding to the anomaly.

* * * * *